US012620349B2

(12) United States Patent
Hong et al.

(10) Patent No.: US 12,620,349 B2
(45) **Date of Patent: *May 5, 2026**

(54) DISPLAY DEVICE AND DRIVING METHOD THEREOF

(71) Applicant: Samsung Display Co., LTD., Yongin-si (KR)

(72) Inventors: Seok Ha Hong, Yongin-si (KR); Hyung Jin Kim, Yongin-si (KR); Kyung Su Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,378

(22) Filed: Nov. 18, 2024

(65) Prior Publication Data

US 2025/0087138 A1 Mar. 13, 2025

Related U.S. Application Data

(63) Continuation of application No. 18/242,091, filed on Sep. 5, 2023, now Pat. No. 12,148,363.

(30) Foreign Application Priority Data

Nov. 2, 2022 (KR) ........................ 10-2022-0144561

(51) Int. Cl.
*G09G 3/32* (2016.01)

(52) U.S. Cl.
CPC ....... *G09G 3/32* (2013.01); *G09G 2300/0465* (2013.01); *G09G 2300/0842* (2013.01); *G09G 2330/021* (2013.01)

(58) Field of Classification Search
CPC ......... G09G 3/3233; G09G 2300/0465; G09G 2300/0842; G09G 2320/0271
See application file for complete search history.

(56) References Cited

U.S. PATENT DOCUMENTS

| | | | | |
|---|---|---|---|---|
| 12,148,363 | B2 * | 11/2024 | Hong | G09G 3/3233 |
| 2021/0217368 | A1 * | 7/2021 | Sohn | G09G 3/3208 |
| 2023/0138436 | A1 | 5/2023 | Lee et al. | |

FOREIGN PATENT DOCUMENTS

| | | | |
|---|---|---|---|
| KR | 102400840 | B1 | 5/2022 |
| WO | 2019074330 | A1 | 4/2019 |

* cited by examiner

*Primary Examiner* — Kevin M Nguyen
(74) *Attorney, Agent, or Firm* — CANTOR COLBURN LLP

(57) ABSTRACT

A display device includes: a memory; a pixel unit including first pixels disposed with a first density in a first area and second pixels disposed with a second density smaller than the first density in a second area in contact with the first area; and a degradation compensator which updates degradation information stored in the memory, based on input grayscales for the first and second pixels, and changes the input grayscales to output grayscales, based on the degradation information. The degradation compensator stores the degradation information in the memory in a unit of block for the pixel unit. The memory stores only first degradation information for each of first blocks including only the first pixels, stores only second degradation information for each of second blocks including only the second pixels, and stores the first and second degradation information for each of third blocks including both the first and second pixels.

20 Claims, 11 Drawing Sheets

DISPLAY DEVICE AND DRIVING METHOD THEREOF

This application is a continuation of U.S. patent application Ser. No. 18/242,091, filed on Sep. 5, 2023, which claims priority to Korean patent application No. 10-2022-0144561, filed on Nov. 2, 2022, and all the benefits accruing therefrom under 35 U.S.C. § 119, the content of which in its entirety is herein incorporated by reference.

BACKGROUND

1. Field

The disclosure generally relates to a display device and a driving method thereof.

2. Description of the Related Art

With the development of information technologies, the importance of a display device which is a connection medium between a user and information increases. Accordingly, display devices such as a liquid crystal display device and an organic light emitting display device are increasingly used.

In order to implement a large-scale display screen, a design in which the existing camera hole is removed and a camera is disposed under a pixel unit has been spotlighted. Pixels overlapping the camera and pixels not overlapping the camera may be configured differently from each other in terms of arrangements, areas, densities, element characteristics, circuits, and the like.

SUMMARY

In a display device where pixels overlapping a camera and pixels not overlapping a camera are configured differently from each other, there is an issue that a boundary between different kinds of pixels is viewed in image display. In particular, such an issue may become more serious as the pixels are degraded.

Embodiments provide a display device and a driving method thereof, in which although different kinds of pixels are degraded, the degradation of the pixels can be compensated with a minimum memory capacity.

In accordance with an embodiment of the disclosure, there is provided a display device including: a memory; a pixel unit including first pixels disposed with a first density in a first area, the pixel unit including second pixels disposed with a second density less than the first density in a second area in contact with the first area; and a degradation compensator which updates degradation information stored in the memory, based on input grayscales for the first pixels and the second pixels, and changes the input grayscales to output grayscales, based on the degradation information, where the degradation compensator stores the degradation information in the memory in a unit of block for the pixel unit, and the memory stores only first degradation information for each of first blocks including only the first pixels, stores only second degradation information for each of second blocks including only the second pixels, and stores both the first degradation information and the second degradation information for each of third blocks including both the first pixels and the second pixels.

In an embodiment, the first degradation information may be information obtained under a condition that pixels constituting a corresponding block are all the first pixels, and the second degradation information may be information obtained under a condition that pixels constituting a corresponding block are all the second pixels.

In an embodiment, a size of a storage space of the degradation information allocated to the memory with respect to each of the third blocks may be greater than a size of a storage space of the degradation information allocated to the memory with respect to each of the first blocks or each of the second blocks.

In an embodiment, a size of a storage space of the first degradation information allocated to the memory and a size of a storage space of the second degradation information allocated to the memory may be the same as each other.

In an embodiment, the size of the storage space of the degradation information allocated to the memory for each of the third blocks may be two times the size of the storage space of the degradation information allocated to the memory for each of the first blocks or each of the second blocks.

In an embodiment, the degradation compensator may include a block determiner which determines a corresponding block of the input grayscales, among the first blocks, the second blocks, and the third blocks.

In an embodiment, the degradation compensator may further include a first degradation information generator which updates the first degradation information of the corresponding block, based on the input grayscales determined to correspond to the first blocks or the third blocks.

In an embodiment, the degradation compensator may further include a second degradation information generator which updates the second degradation information of the corresponding block, based on the input grayscales determined to correspond to the second blocks or the third blocks.

In an embodiment, the degradation compensator may further include a pixel determiner which determines corresponding pixels of the input grayscales, among the first pixels and the second pixels.

In an embodiment, the degradation compensator may further include a grayscale changer which changes the input grayscales to the output grayscales, based on the first degradation information, when the input grayscales correspond to the first pixels, and changes the input grayscales to the output grayscales, based on the second degradation information, when the input grayscales correspond to the second pixels.

In accordance with an embodiment of the disclosure, there is provided a method of driving a display device including first pixels disposed with a first density in a first area, second pixels disposed with a second density less than the first density in a second area in contact with the first area, and a memory which stores degradation information in a unit of block with respect to the first pixels and the second pixels, the method including: receiving input grayscales for the first pixels and the second pixels; updating the degradation information stored in the memory, based on the input grayscales; and changing the input grayscales to output grayscales, based on the degradation information, where the memory stores only first degradation information for each of first blocks including only the first pixels, stores only second degradation information for each of second blocks including only the second pixels, and stores both the first degradation information and the second degradation information for each of third blocks including both the first pixels and the second pixels.

In an embodiment, the first degradation information may be information obtained under a condition that pixels constituting a corresponding block are all the first pixels, and the second degradation information may be information obtained under a condition that pixels constituting a corresponding block are all the second pixels.

In an embodiment, a size of a storage space of the degradation information allocated to the memory for each of the third blocks may be greater than a size of a storage space of the degradation information allocated to the memory for each of the first blocks or each of the second blocks.

In an embodiment, a size of a storage space of the first degradation information allocated to the memory and a size of a storage space of the second degradation information allocated to the memory may be the same as each other.

In an embodiment, the size of the storage space of the degradation information allocated to the memory for each of the third blocks may be two times the size of the storage space of the degradation information allocated to the memory for each of the first blocks or each of the second blocks.

In an embodiment, the method may further include determining a corresponding block of the input grayscales, among the first blocks, the second blocks, and the third blocks.

In an embodiment, the updating the degradation information may include updating the first degradation information of the corresponding block, based on the input grayscales determined to correspond to the first blocks or the third blocks.

In an embodiment, the updating the degradation information may include updating the second degradation information of the corresponding block, based on the input grayscales determined to correspond to the second blocks or the third blocks.

In an embodiment, the method may further include determining corresponding pixels of the input grayscales, among the first pixels and the second pixels.

In an embodiment, the changing the input grayscales to the output grayscales may include changing the input grayscales to the output grayscales, based on the first degradation information, when the input grayscales correspond to the first pixels, and changing the input grayscales to the output grayscales, based on the second degradation information, when the input grayscales correspond to the second pixels.

DETAILED DESCRIPTION

Figure 1:
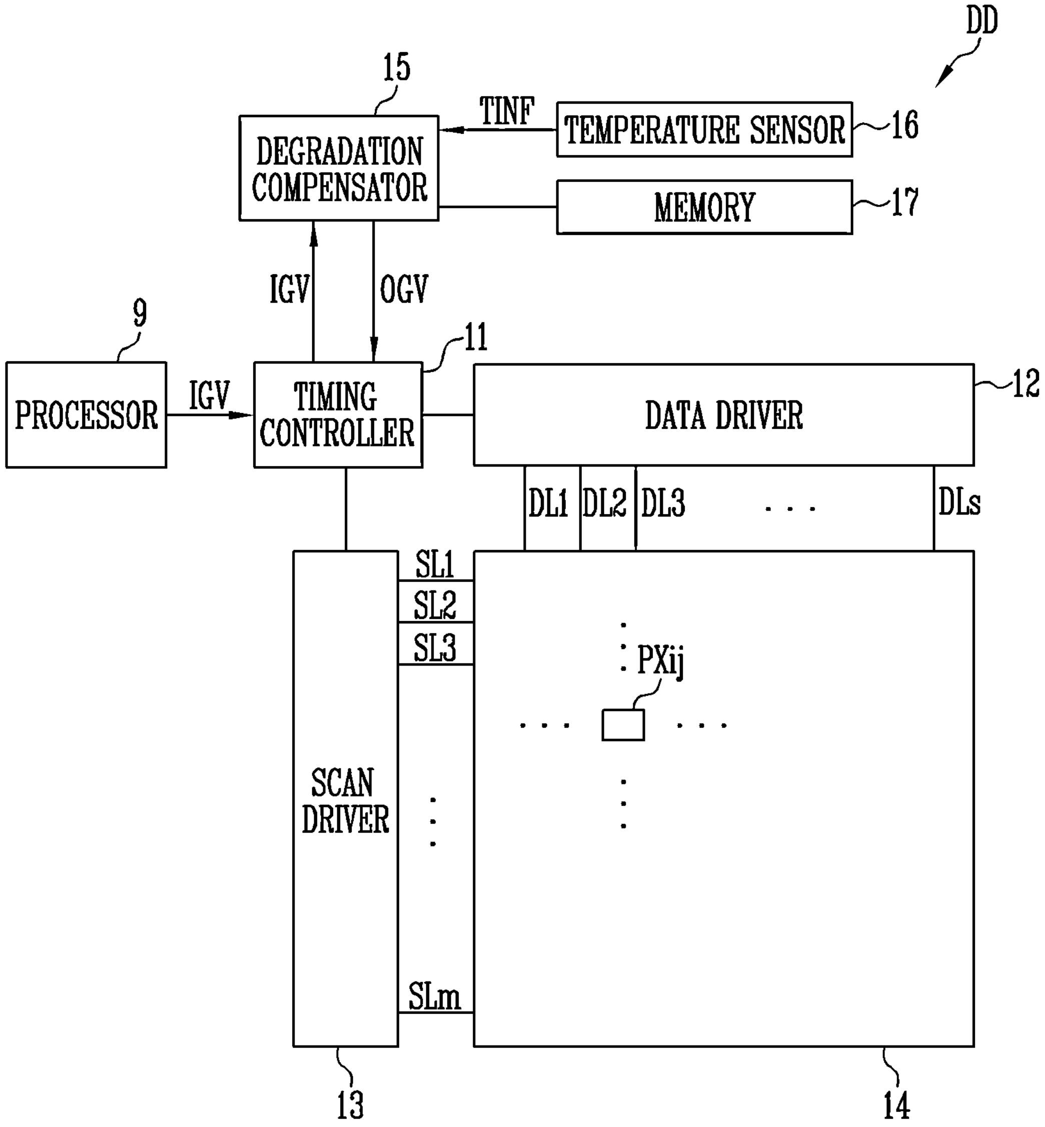
FIG. 1 is a diagram illustrating a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

A part irrelevant to the description will be omitted to clearly describe the disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the disclosure is not limited thereto. Thicknesses of several portions and regions are exaggerated for clear expressions.

In the drawing figures, dimensions may be exaggerated for clarity of illustration. It will be understood that when an element is referred to as being "between" two elements, it can be the only element between the two elements, or one or more intervening elements may also be present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In description, the expression "equal" may mean "substantially equal." That is, this may mean equality to a degree to which those skilled in the art can understand the equality. Other expressions may be expressions in which "substantially' is omitted.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a diagram illustrating a display device in accordance with an embodiment of the disclosure.

Referring to FIG. 1, the display device DD in accordance with an embodiment of the disclosure may include a timing controller 11, a data driver 12, a scan driver 13, a pixel unit 14, a degradation compensator 15, a temperature sensor 16, and a memory 17.

The timing controller 11 may receive a timing signal including a vertical synchronization signal, a horizontal synchronization signal, a data enable signal and the like, and input grayscales IGV with respect to each image frame from a processor 9 (e.g., a graphics processing unit (GPU), a central processing unit (CPU), an application processor (AP), or the like).

The timing controller 11 may supply control signals to each of the data driver 12 and the scan driver 13, corresponding to specifications of each of the data driver 12 and the scan driver 13. Also, the timing controller 11 may provide the input grayscales IGV to the degradation compensator 15, and receive output grayscales OGV from the degradation compensator 15. The timing controller 11 may provide the output grayscales OGV to the data driver 12. However, referring in advance to FIG. 3, some of the output grayscales OGV may be grayscales for a non-pixel area NPA. The timing controller 11 may render the output grayscales OGV in way such that output grayscales for the non-pixel area NPA can be expressed by peripheral pixel areas PXA1 and PXA2, and then provide the rendered output grayscales OGV may be provided to the data driver 12.

In an embodiment, the timing controller 11 and the degradation compensator 15 may be configured independently or separately from each other, or be configured as (or defined by portions of) one integrated hardware (e.g., an integrated chip). In an embodiment, the degradation compensator 15 may be implemented in a software manner in the timing controller 11. In some embodiments, the data driver 12 and the timing controller 11 may be configured as one hardware or chip. In some embodiments, the data driver 12, the timing controller 11, and the degradation compensator 15 may be configured as one hardware or chip.

The data driver 12 may generate data voltages to be provided to data lines DL1, DL2, DL3, . . . , and DLs by using the output grayscales OGV and the control signals. In an embodiment, for example, the data driver 12 may sample the output grayscales OGV by using a clock signal, and apply data voltages corresponding to the output grayscales OGV to the data lines DL1 to DLs in units of pixel rows. A pixel row may mean pixels connected to a same scan line. Here, s may be an integer greater than 0.

The scan driver 13 may receive a clock signal, a scan start signal, and the like from the timing controller 11, thereby generating scan signals to be provided to scan lines SL1, SL2, SL3, . . . , SLm. Here, m may be an integer greater than 0.

The scan driver 13 may sequentially supply scan signals having a pulse of a turn-on level to the scan lines SL1 to SLm. The scan driver 13 may include stages configured in the form of shift registers. The scan driver 13 may generate scan signal in a manner that each scan stage sequentially transfers the scan start signal in the form of a pulse of a turn-on level to a next scan stage under the control of the clock signal.

The pixel unit 14 may include pixels including light emitting elements. Each pixel PXij may be connected to a corresponding data line and a corresponding scan line. Here, i and j may be integers greater than 0. The pixel PXij may mean a pixel connected to an i-th scan line and a j-th data line.

Although not shown in the drawing, the display device DD may further include an emission driver. The emission driver may receive a clock signal, an emission stop signal, and the like from the timing controller 11, thereby generating emission signals to be provided to emission lines. In an embodiment, for example, the emission driver may include emission stages connected to the emission lines. The emission stages may be configured in the form of shift registers. In an embodiment, for example, a first emission stage may generate an emission signal having a turn-off level, based on the emission stop signal having a turn-off level, and the other emission stages may sequentially generate emission signals having a turn-off level, based on an emission signal having a turn-off level, which is generated by a previous emission stage.

In an embodiment where the display device DD includes the above-described emission driver, each pixel PXij may further include a transistor connected to a corresponding emission line. The transistor may prevent may be turned off during a data writing period of each pixel PXij, to prevent emission of the pixel PXij. Hereinafter, for convenience of description, embodiments where the emission driver is not provided will be described in detail.

The temperature sensor 16 may provide temperature information. The temperature information may be information on an ambient temperature of the display device DD. In an embodiment, for example, a single temperature sensor 16 may be provided in the display device DD.

The degradation compensator 15 may update degradation information stored in the memory 17, based on input grayscales IGV, and change the input grayscales IGV to output grayscales OGV, based on the degradation information. The degradation compensator 15 may store the degradation information in the memory 17 in units of blocks (or on a block-by-block basis) with respect to the pixel unit 14.

Figure 4:
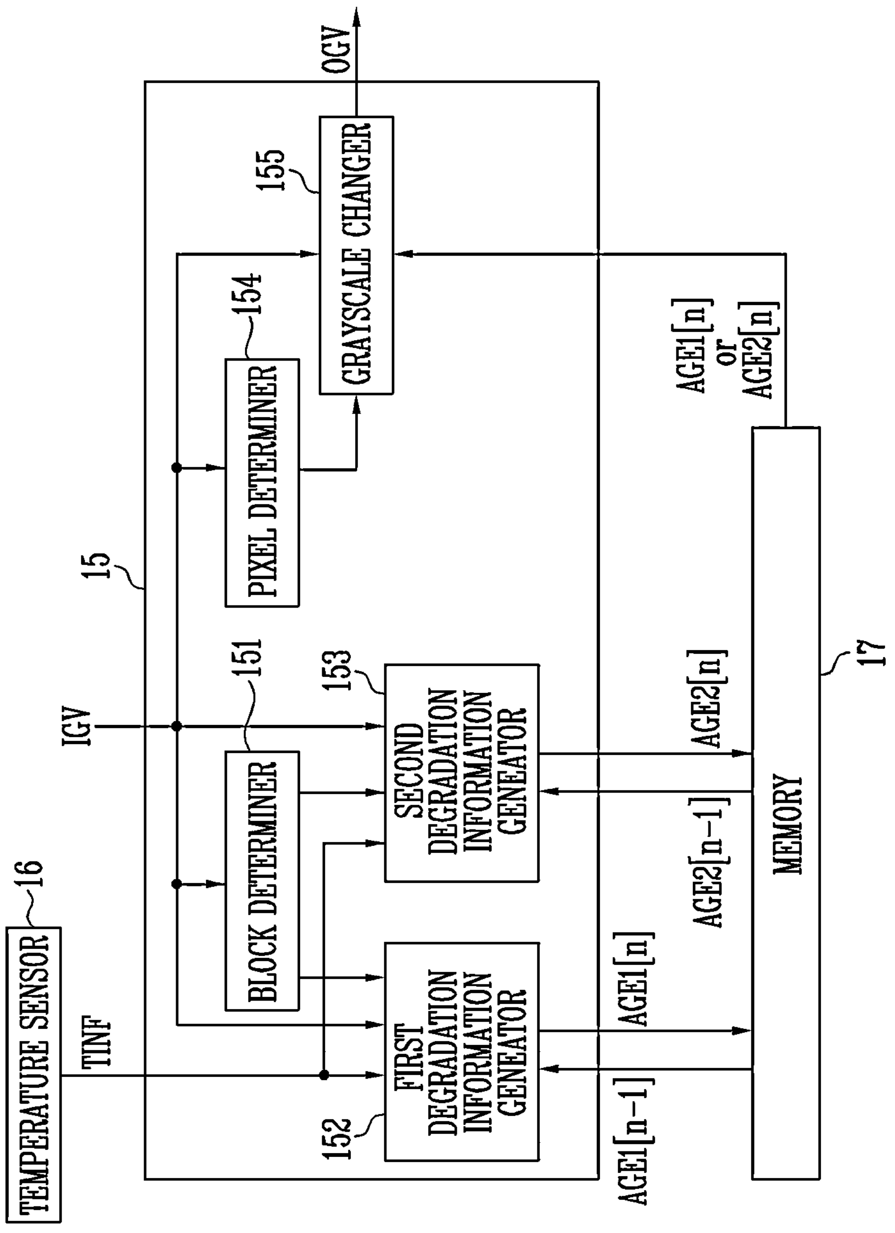
FIG. 4 is a diagram illustrating a degradation compensator in accordance with an embodiment of the disclosure.

In some embodiments, the degradation compensator 15 may update the degradation information stored in the memory 17, based on the input grayscales IGV and temperature information TINF. In an embodiment, for example, the degradation compensator 15 (e.g., a first degradation information generator 152 and a second degradation information generator 153, which are shown in FIG. 4) may calculate expected temperatures in a pixel unit or a block unit, based on the input grayscales IGV and the temperature information TINF. In an embodiment, for example, with respect to the ambient temperature, calculation may be performed in a way such that a pixel having a high input grayscale has a higher expected temperature. In an alternative embodiment, the degradation compensator 15 may more accurately calculate an expected temperature by using a current sensor (not shown) provided in the display device DD. In an embodiment, for example, with respect to the ambient temperature, calculation may be performed in a way such that a pixel having a high input grayscale and a large current flowing therethrough has a higher expected temperature. The calculation of the expected temperatures may be performed by adopting techniques already known in the art. In another alternative embodiment, for example, the temperature sensor 16 may be provided in plurality in the pixel unit or the block unit.

The memory 17 may store degradation information including degradation degrees of the light emitting elements (or the pixels). The memory 17 may be a dedicated memory for implementation of such an operation, or be a portion of another memory (e.g., a frame memory). The memory 17 may be implemented as a conventional data storage device (e.g., a static random access memory (RAM) (SRAM), a dynamic RAM (DRAM), a pseudo SRAM (PSRAM), a synchronous DRAM (SDRAM), a double data rate SDRAM (DDR SDRAM), or the like), and therefore, detailed descriptions thereof will be omitted.

The degradation information may be accumulated information of degradation degrees of each block from an initial operation time to a recent update time. In an embodiment, for example, as a block has a higher grayscale, has a higher temperature, and is used for a longer time, the degradation degree of the corresponding block may become higher (or greater). In such an embodiment, as a block has a lower grayscale, has a lower temperature, and is used for a shorter time, the degradation degree of the corresponding block may become lower (or lesser). In an embodiment, the memory 17 may not store accumulated information until past update times before the recent update time to reduce memory cost.

Figure 2:
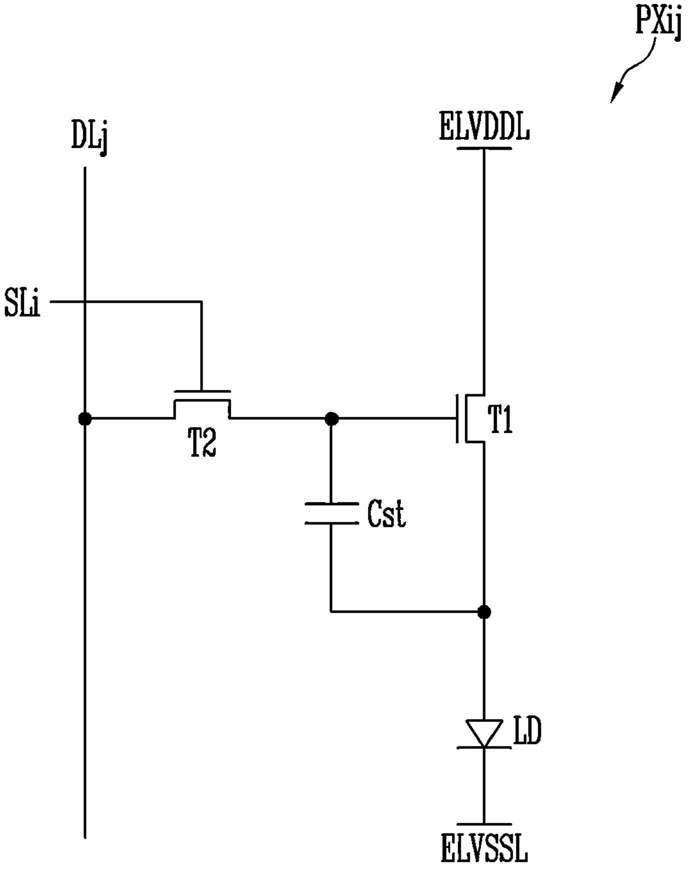
FIG. 2 is a diagram illustrating a pixel in accordance with an embodiment of the disclosure.

FIG. 2 is a diagram illustrating a pixel in accordance with an embodiment of the disclosure.

Referring to FIG. 2, the pixel PXij may include transistors T1 and T2, a storage capacitor Cst, and a light emitting element LD.

Hereinafter, an embodiment of a pixel circuit implemented with an N-type transistor will be described as an example. However, those skilled in the art may design a circuit implemented with a P-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current increases when the difference in voltage between a gate electrode and a source electrode increases in a negative direction s. The N-type transistor refers to a transistor in which an amount of current increases when the difference in voltage between a gate electrode and a source electrode increases in a positive direction. The transistor may be configured in various forms including a thin film transistor (TFT), a field effect transistor (FET), a bipolar junction transistor (BJT), and the like.

In an embodiment of a pixel circuit PXij, as shown in FIG. 2, a gate electrode of a first transistor T1 may be connected to a first electrode of the storage capacitor Cst, a first electrode of the first transistor T1 may be connected to a first power line ELVDDL, and a second electrode of the first transistor T1 may be connected to a second electrode of the storage capacitor Cst. The first transistor T1 may be referred to as a driving transistor.

A gate electrode of a second transistor T2 may be connected to an i-th scan line SLi, a first electrode of the second transistor T2 may be connected to a j-th data line DLj, and a second electrode of the second transistor T2 may be connected to the gate electrode of the first transistor T1. The second transistor T2 may be referred to as a scan transistor. Here, i and j may be integers greater than 0.

The first electrode of the storage capacitor Cst may be connected to the gate electrode of the first transistor T1, and the second electrode of the storage capacitor Cst may be connected to the second electrode of the first transistor T1.

An anode of the light emitting element LD may be connected to the second electrode of the first transistor T1, and a cathode of the light emitting element LD may be connected to a second power line ELVSSL. The light emitting element LD may be configured as an organic light emitting diode, an inorganic light emitting diode, a quantum dot light emitting diode, or the like. FIG. 2 shows an embodiment where the pixel PXij includes a single light emitting element LD. However, in an alternative embodiment, the pixel PXij may include a plurality of light emitting elements connected to each other in series, parallel or series/parallel.

A first power voltage may be applied to the first power line ELVDDL, and a second power voltage may be applied to the second power line ELVSSL. In an embodiment, for example, during an image display period, the first power voltage may be higher than the second power voltage.

When a scan signal having a turn-on level (here, a logic high level) is applied through the scan line SLi, the second transistor T2 is in a turn-on state. A data voltage applied to the data line DLj is stored in the first electrode of the storage capacitor Cst.

A positive driving current corresponding to a voltage difference between the first electrode and the second electrode of the storage capacitor Cst flows between the first electrode and the second electrode of the first transistor T1. Accordingly, the light emitting element LD emits light with a luminance corresponding to the data voltage.

Next, when a scan signal having a turn-off level (here, a logic low level) is applied through the scan line SLi, the second transistor T2 is turned off, and the data line DLj and the first electrode of the storage capacitor Cst are electrically separated from each other. Thus, although the data voltage of the data line DLj is changed, the voltage stored in the first electrode of the storage capacitor Cst is not change.

The features of embodiments described herein may be applied to not only embodiments including the pixel PXij shown in FIG. 2 but also alternative embodiments including a pixel having another pixel circuit. In an embodiment, for example, where the display device DD further include an emission driver, the pixel PXij may further include a transistor connected to an emission line.

Figure 3:
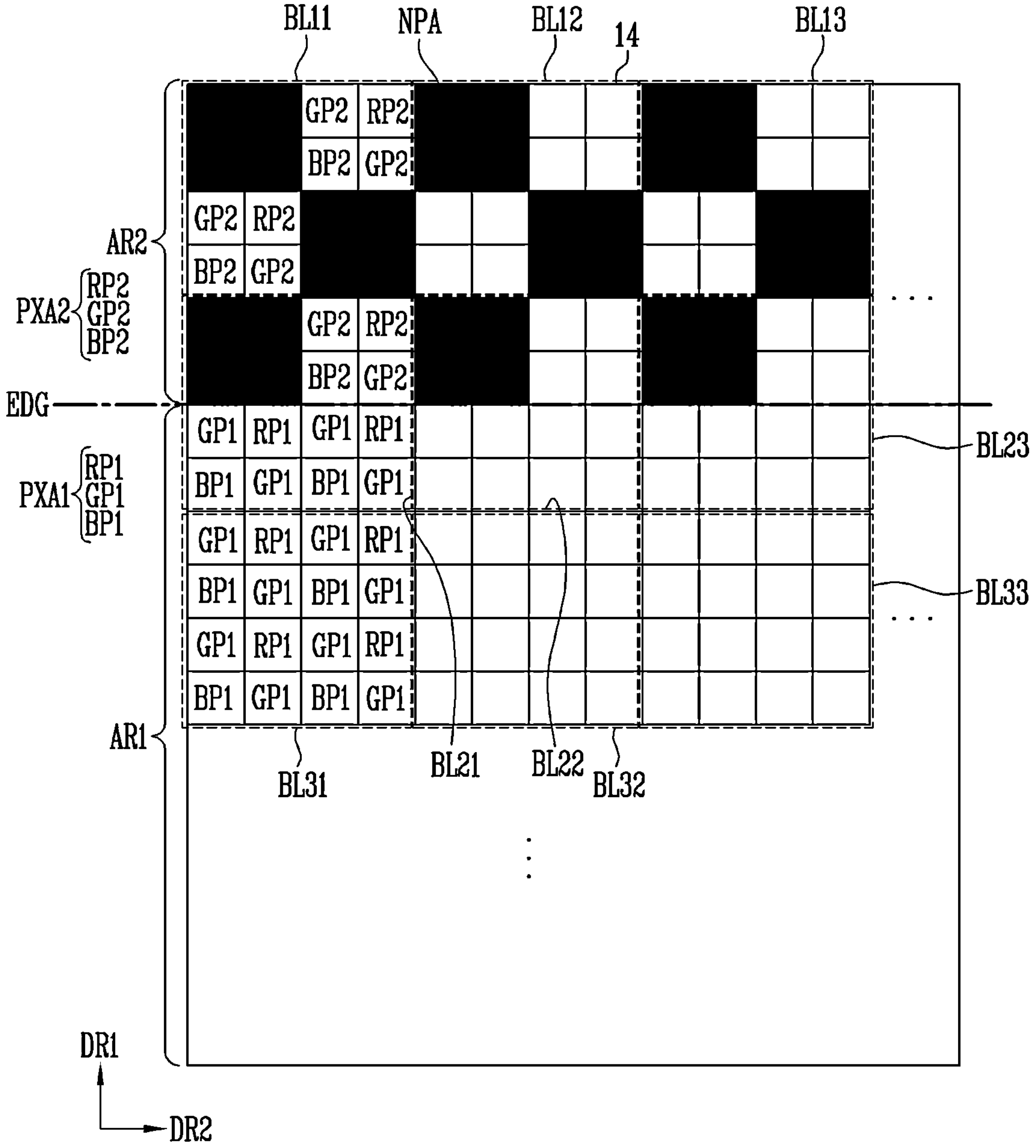
FIG. 3 is a diagram illustrating a pixel unit in accordance with an embodiment of the disclosure.

FIG. 3 is a diagram illustrating a pixel unit in accordance with an embodiment of the disclosure.

Referring to FIG. 3, the pixel unit 14 in accordance with an embodiment of the disclosure may include a first area AR1 and a second area AR2. The first area AR1 and the second area AR2 may be in contact with each other at a boundary EDG thereof.

The first area AR1 may include first pixels RP1, GP1, and BP1 arranged therein with a first density. The first pixel RP1 may be a pixel of a first color, the first pixel GP1 may be a pixel of a second color, and the first pixel BP1 may be a pixel of a third color. The first to third colors may be different from each other. The second area AR2 may include second pixels RP2, GP2, and BP2 arranged therein with a second density less than the first density. The second pixel RP2 may be a pixel of the first color, the second pixel GP2 may be a pixel of the second color, and the second pixel BP2 may be a pixel of the third color. The first density may mean a rate of a first pixel area PXA1 in the first area AR1. The first pixel area PXA1 may include light emitting surfaces of the first pixels RP1, GP1, and BP1. In an embodiment, for example, where any non-pixel area does not exist in the first area AR1 as shown in FIG. 3, the first density may be 100%. The second density may mean a rate of a second pixel area PXA2 in the second area AR2. The second pixel area PXA2 may include light emitting surfaces of the second pixels RP2, GP2, and BP2. In an embodiment, for example, when a non-pixel area NPA exists in the second area AR2 as shown in FIG. 3, the second density may be 50%.

Pixels of the pixel unit 14 may be arranged in various forms including diamond PENTILE™, RGB-stripe, S-stripe, reach RGB, a normal PENTILE™, and the like, and the disclosure is not limited to the arrangement shown in FIG. 3.

The display device DD may include optical sensors (not shown) such as a camera, a fingerprint sensor, a proximity sensor, and an illuminous sensor. In an embodiment, for example, the optical sensors may be located under the second area AR2. The optical sensors may sense light received through the non-pixel area NPA of the second area AR2, to serve as a camera, a fingerprint sensor, a proximity sensor, an illuminous sensor, or the like.

The first pixels RP1, GP1, and BP1 and the second pixels RP2, GP2, and BP2 may be configured differently from each other in terms of arrangements, areas, densities, element characteristics, circuits, and the like. In an embodiment, for example, element configurations of the first pixels RP1, GP1, and BP1 and the second pixels RP2, GP2, and BP2 are identical to each other, and pixel numbers per unit area may be different from each other. In an embodiment, for example, a number of the first pixels RP1, GP1, and BP1 per unit area may be greater than a number of the second pixels RP2, GP2, and BP2 per unit area. The second pixels RP2, GP2, and BP2 are to compensate for a luminance decrement of the non-pixel area NPA, and therefore, it is desired to output a luminance higher than a luminance of the first pixels RP1, GP1, and BP1 with respect to a same input grayscale. In such an embodiment, a degradation degree of the second pixels RP2, GP2, and BP2 may be higher than a degradation degree of the first pixels RP1, GP1, and BP1 with respect to a same input grayscale.

In an embodiment, the first pixels RP1, GP1, and BP1 and the second pixels RP2, GP2, and BP2 may have different element configurations from each other. In an embodiment, for example, a light emitting area of light emitting elements of the second pixels RP2, GP2, and BP2 may be configured to be greater than a light emitting area of light emitting elements of the first pixels RP1, GP1, and BP1. In such an embodiment, the degradation degree of the second pixels RP2, GP2, and BP2 may be lower than the degradation degree of the first pixels RP1, GP1, and BP1 with respect to the same input grayscale.

Regardless of physical configurations, the pixel unit 14 may be divided in a block unit as a logical unit. In an embodiment, for example, the degradation compensator 15 may store degradation information in the block unit with respect to the pixel unit 14.

As shown in FIG. 3, the pixels RP1, GP1, BP1, RP2, GP2, and BP2 included in the pixel unit 14 may be divided into a plurality of blocks BL11, BL12, BL13, . . . , BL21, BL22, BL23, . . . , BL31, BL32, BL33, . . . . In an embodiment, for example, blocks BL11 to BL33, . . . may not overlap each other. Although FIG. 3 illustrates an embodiment where one block includes 16 pixels, the number of pixels included in one block may vary in some embodiments.

In an embodiment, blocks including only the first pixels RP1, GP1, and BP1 are defined as first blocks BL31, BL32, BL33, . . . . The first blocks BL31, BL32, BL33, . . . may be located inside the first area AR1. In such an embodiment, blocks including only the second pixels RP2, GP2, and BP2 are defined as second blocks BL11, BL12, BL13, . . . . The second blocks BL11, BL12, BL13, . . . may be located inside the second area AR2. In such an embodiment, blocks including both the first pixels RP1, GP1, and BP1 and the second pixels RP2, GP2, and BP2 are defined as third blocks BL21, BL22, BL23, . . . . Some of the third blocks BL21, BL22, BL23, . . . may exist in the first area AR1, and other some of the third blocks BL21, BL22, BL23, . . . may exist in the second area AR2. The third blocks BL21, BL22, BL23, . . . may overlap the boundary EDG.

The number of the blocks BL11 to BL33, . . . may be variously changed corresponding to specifications (size, resolution, and the like) of the pixel unit 14. In an embodiment, for example, the pixels of the pixel unit 14 may be configured to have a number of 3840×2160. Expected temperatures may be calculated in a relatively large block unit (e.g., one block defined by 240×120 pixels), and degradation degrees may be stored in a relatively small block unit (e.g., one block defined by 8×8 pixels).

In an embodiment, data of a large block unit and data of a small block unit may be calculated together by adjusting the units (i.e., numbers of pixels included in each block). In an embodiment, for example, interpolation (e.g., binary interpolation) may be performed on adjacent large block units, so that a small block unit or an individual pixel unit may be calculated based on the large block unit. In an embodiment, an average value of adjacent small block unit or adjacent pixel units may be calculated, so that a large block unit may be calculated based on a small block unit or an individual pixel unit. As described above, the individual pixel unit, the small block unit, and the large block unit can be used differently from each other considering various factors (e.g., memory cost, accuracy or the like), and be compatible with each other.

FIG. 4 is a diagram illustrating a degradation compensator in accordance with an embodiment of the disclosure.

Referring to FIG. 4, the degradation compensator 15 in accordance with an embodiment of the disclosure may include a block determiner 151, a first degradation information generator 152, a second degradation information generator 153, a pixel determiner 154, and a grayscale changer 155.

The degradation compensator 15 may update degradation information AGE1[*n*] and AGE[n] stored in the memory 17, based on input grayscales IGV for the first pixels RP1, GP1, and BP1 and the second pixels RP2, GP2, and BP2, and change the input grayscales IGV to output grayscales OGV, based on the degradation information AGE1[*n*] and AGE[n].

The memory 17 may store only first degradation information AGE1[*n*] for each of the first blocks BL31, BL32, BL33, . . . including only the first pixels RP1, GP1, and BP1, and store only second degradation information AGE2[*n*] for each of the second blocks BL11, BL12, BL13, . . . including only the second pixels RP2, GP2, and BP2, and store both the first degradation information AGE1[*n*] and the second degradation information AGE2[*n*] for each of the third blocks BL21, BL22, BL23, . . . including both the first pixels RP1, GP1, and BP1 and the second pixels RP2, GP2, and BP2.

The first degradation information AGE1[*n*] may be information obtained under a condition (or based on an assumption) that pixels constituting a corresponding block are all the first pixels RP1, GP1, and BP1. The second degradation information AGE2[*n*] may be information obtained based on an assumption that pixels constituting a corresponding block are all the second pixels RP2, GP2, and BP2. That is, although the first pixels RP1, GP1, and BP1 and the second pixels RP2, GP2, and BP2 are mixed in a third block, the memory 17 may store the first degradation information AGE1[*n*] obtained under a condition that pixels constituting the third block are all the first pixels RP1, GP1, and BP1, and simultaneously, store the second degradation information AGE2[n] obtained under a condition that the pixels constituting the third block are all the second pixels RP2, GP2, and BP2. Therefore, a size of a storage space of degradation information allocated to the memory 17 with respect to each of the third blocks BL21, BL22, BL23, . . . is greater than a size of a storage space of degradation information allocated to the memory 17 with respect to each of the first blocks BL31, BL32, BL33, . . . or the second blocks BL11, BL12, BL13, . . . .

In an embodiment, a size of a storage space of the first degradation information AGE1[n] allocated to the memory 17 and a size of a storage space of the second degradation information AGE2[n] may be the same as each other. The size of the storage space of degradation information allocated to the memory 17 with respect to each of the third blocks BL21, BL22, BL23, . . . may be two times of the size of the storage space of degradation information allocated to the memory 17 with respect to each of the first blocks BL31, BL32, BL33, . . . or the second blocks BL11, BL12, BL13, . . . .

In such an embodiment, a partial memory space may be additionally allocated with respect to only the third blocks BL21, BL22, BL23, . . . located at the boundary EDG. In such embodiment, the additional allocation of the memory space is additional allocation in a block unit instead of a pixel unit, and hence the increasing cost of the memory 17 is minimized.

The block determiner 151 may determine to which blocks the input grayscales IGV correspond (or determine a corresponding block of the input grayscales IGV) among the first blocks BL31, BL32, BL33, . . . , the second blocks BL11, BL12, BL13, . . . , and the third blocks BL21, BL22, BL23, . . . .

The first degradation information generator 152 may update first degradation information AGE1[n−1] of the corresponding block, determined to correspond to the first blocks BL31, BL32, BL33, . . . or the third blocks BL21, BL22, BL23, . . . based on the input grayscales IGV. The updated first degradation information AGE1[n] may be stored in the memory 17.

In an embodiment, for example, the first degradation information generator 152 may further refer to temperature information TINF when updating the first degradation information AGE1[n−1].

The first degradation information generator 152 may calculate a current first degradation amount, based on the temperature information TINF and the input grayscales IGV, and accumulate the current first degradation amount in the first degradation information AGE1[n−1], thereby updating the first degradation information AGE1[n−1]. In an embodiment, for example, the updated first degradation information AGE1[n] may be calculated as shown in the following Equation 1.

$$AGE1[n] = AGE1[n-1] + CDA1[n] \quad \text{[Equation 1]}$$

Here, AGE1[n−1] denotes first degradation information AGE1[n−1] in which first degradation amounts are accumulated from a first image frame to an (n−1)-th image frame. AGE1[n] denotes first degradation information AGE1[n] in which first degradation amounts are accumulated from the first image frame to an n-th image frame. Here, n may be an integer greater than 1. CDA1[n] denotes an n-th first degradation amount CDA1[n] calculated based on input grayscales IGV of the n-th image frame and associated temperature information TINF.

In an embodiment, the n-th first degradation amount CDA1[n] may correspond to an average value of individual degradation amounts of individual pixels belonging to a block. An individual degradation amount CDA1e[n] may be calculated as shown in the following Equation 2.

$$CDA1e[n] = lmc * tpc \quad \text{[Equation 2]}$$

Here, lmc denotes a luminance coefficient. The luminance coefficient lmc may be in proportion to an input grayscale corresponding to each pixel. That is, as the input grayscale becomes higher, the luminance coefficient lmc may become greater. Here, tpc denotes a temperature coefficient. The temperature coefficient tpc may be in proportion to an expected temperature corresponding to each pixel. That is, as the expected temperature becomes higher, the temperature coefficient tpc may become greater.

The luminance coefficient lmc may be calculated as shown in the following Equation 3.

$$lmc = [(IGVu/IGVm)\hat{}gma]\hat{}lmac \quad \text{[Equation 3]}$$

Here, IGVu denotes an input grayscale (e.g., a value within a range of 0 to 255) of each pixel among the input grayscales IGV, and IGVm denotes a maximum input grayscale (e.g., 255), gma denotes predetermined gamma value (e.g., 2.2), and lmac denotes a predetermined luminance acceleration coefficient (e.g., a value within a range of 1.0 to 2.0).

The temperature coefficient tpc may be calculated as shown in the following Equation 4.

$$tpc = \exp\hat{}[-Ea/(k * T)] \quad \text{[Equation 4]}$$

Here, exp denotes the base of a natural logarithm, and Ea denotes a predetermined temperature acceleration coefficient (e.g., a value within a range of 0.2 to 0.5). Here, k denotes a predetermined constant. Here, T denotes an expected temperature corresponding to each pixel. The unit of the expected temperature may be an absolute temperature.

In an embodiment, the first degradation information generator 152 may not directly calculate Equation 4. In an embodiment, for example, the first degradation information generator 152 may pre-store a temperature coefficient tpc with respect to each expected temperature T in the form of a lookup table, and use the temperature coefficient tpc. In an embodiment, the first degradation information generator 152 may not directly calculate Equation 3. In an embodiment, for example, the first degradation information generator 152 may pre-store a luminance coefficient lmc with respect to each input grayscale IGVu in the form of a lookup table, and use the luminance coefficient lmc. The above-described Equations 1 to 4 are provided to merely describe that the degradation amount is in proportion to the input grayscale and the expected temperature, and it does not mean that calculations are to be necessarily performed according to Equations 1 to 4.

In an alternative embodiment, the n-th first degradation amount CDA1[*n*] may be calculated as shown in the following Equation 5, based on an average grayscale of the pixels belonging to the block.

$$CDA1[n] = 1\ \mathrm{mc} * tpc \quad \text{[Equation 5]}$$

IGVu of Equation 3 denotes an average value of the input grayscales of the pixels of the block. T of Equation 4 denotes an expected temperature corresponding to the block.

The second degradation information generator 153 may update second degradation information AGE2[n−1] of a corresponding block, based on the input grayscales IGV determined to correspond to the second blocks BL11, BL12, BL13, . . . or the third blocks BL21, BL22, BL23, . . . . The updated second degradation information AGE2[*n*] may be stored in the memory 17.

The second degradation information generator 153 may calculate an n-th second degradation amount, based on the temperature information TINF and the input grayscales IGV, and accumulate the nth second degradation amount in the second degradation information AGE2[n−1], thereby updating the second degradation information AGE2[n−1]. In an embodiment, for example, the updated second degradation information AGE2[*n*] may be calculated as shown in the following Equation 6.

$$AGE2[n] = AGE2[n-1] + CDA2[n] \quad \text{[Equation 6]}$$

Here, AGE2[n−1] denotes second degradation information AGE2[n−1] in which second degradation amounts are accumulated from the first image frame to the (n−1)-th image frame. AGE2[*n*] denotes second degradation information AGE2[*n*] in which second degradation amounts are accumulated from the first image frame to the nth image frame. CDA2[*n*] denotes an n-th second degradation amount CDA2[*n*] calculated based on input grayscales IGV of the n-th image frame and associated temperature information TINF.

A calculation method of the n-th second degradation amount CDA2[*n*] is substantially identical to a calculation method of the nth first degradation amount CDA1[*n*] (see descriptions associated with Equations 2 to 5), and therefore, any repetitive detailed descriptions thereof will be omitted. However, a luminance acceleration coefficient lmac used when the nth second degradation amount CDA2[*n*] is calculated and a luminance acceleration coefficient lmac used when the n-th first degradation amount CDA1[*n*] is calculated may be different from each other. In an embodiment, for example, when the degradation degree of the second pixels RP2, GP2, and BP2 is higher than the degradation degree of the first pixels RP1, GP1, and BP1 with respect to a same input grayscale, the luminance acceleration coefficient lmac used when the n-th second degradation amount CDA2[*n*] is calculated may be set smaller than the luminance acceleration coefficient lmac used when the n-th first degradation amount CDA1[*n*] is calculated. Accordingly, although degradation degrees of different kinds of pixels are different from each other, the pixels can output a same luminance with respect to a same input grayscale.

The pixel determiner 154 may determine to which blocks the input grayscales IGV correspond (or determine a corresponding block of the input grayscales IGV) among the first pixels RP1, GP1, and BP1 and the second pixels RP2, GP2, and BP2. That is, although the input grayscales IGV are input grayscales belonging to a same block, the pixel determiner 154 may individually determine to which block each of the input grayscales IGV corresponds (or determine a corresponding block of each of the input grayscales IGV) among the first pixels RP1, GP1, and BP1 and the second pixels RP2, GP2, and BP2.

When the input grayscales IGV correspond to the first pixels RP1, GP1, and BP1, the grayscale changer 155 may change the input grayscales IGV to the output grayscales OGV, based on the first degradation information AGE1[*n*]. When the input grayscales IGV correspond to the second pixels RP2, GP2, and BP2, the grayscale changer 155 may change the input grayscales IGV to the output grayscales OGV, based on the second degradation information AGE2[*n*]. The output grayscales OGV may be equal to or greater than the input grayscales IGV. In an embodiment, for example, as the pixel is a pixel having a greater degradation degree, the grayscale changer 155 may generate an output grayscale having a greater difference from a corresponding input grayscale. In such an embodiment, as the pixel is a pixel having a lower degradation degree, the grayscale changer 155 may generate an output grayscale having a less difference from a corresponding input grayscale.

In an embodiment, as described above with reference to FIG. 4, degradation compensation may be performed with reference to the temperature information TINF of the temperature sensor 16. However, in an alternative embodiment, the display device DD may not include the temperature sensor 16, and the degradation compensator 15 may perform degradation compensation without referring to the temperature information TINF. In an embodiment, for example, the individual degradation amount CDA1*e*[n] of Equation 2 may have a same value as the luminance coefficient lmc. In such an embodiment, the nth first degradation amount CDA1[*n*] of Equation 5 may have a same value as the luminance coefficient lmc. That is, in the degradation compensation, the temperature coefficient tpc may not be considered.

Figure 5:
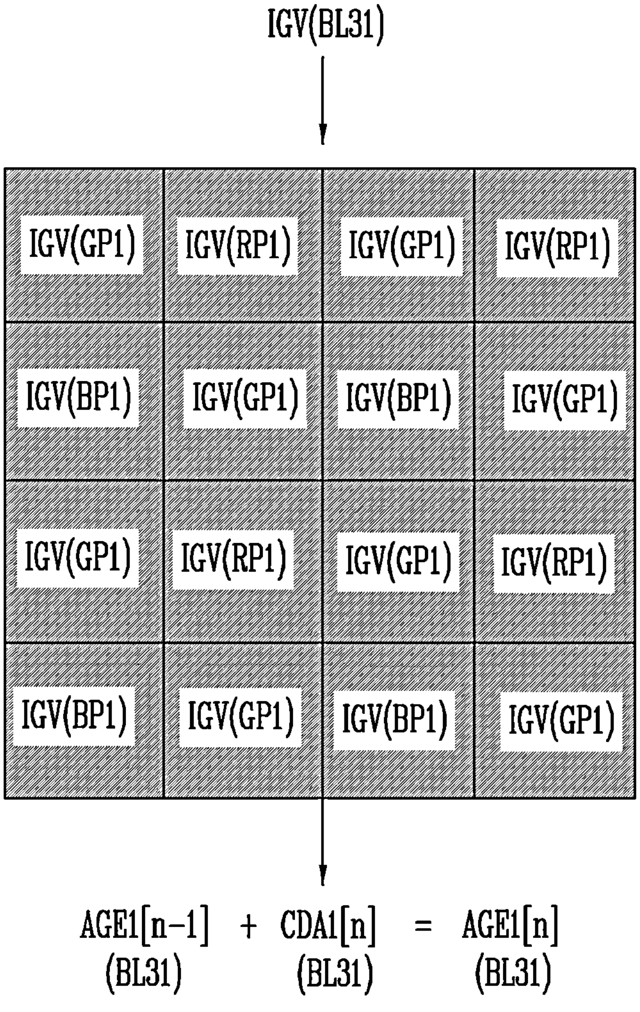
FIGS. 5 and 6 are diagrams illustrating a degradation compensation process of first blocks in accordance with an embodiment of the disclosure.
Figure 6:
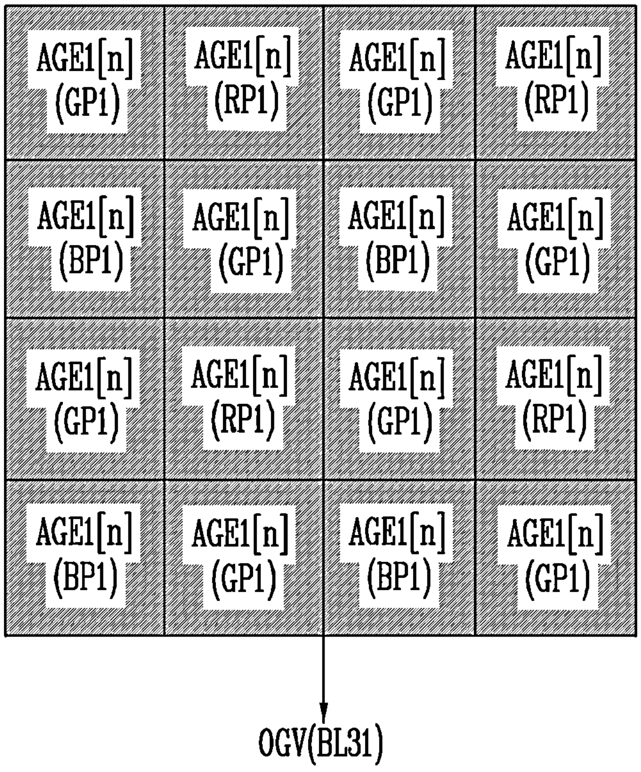

FIGS. 5 and 6 are diagrams illustrating a degradation compensation process of the first blocks in accordance with an embodiment of the disclosure.

A process in which the degradation compensator 15 is operated with respect to a first block BL31 according to an embodiment will hereinafter be described with reference to FIGS. 5 and 6.

In FIG. 5, input grayscales IGV(BL31) are input grayscales IGV(RP1), IGV(GP1), and IGV(BP1) for pixels belonging to the first block BL31, and therefore, the block determiner 151 may determine that the input grayscales IGV(BL31) correspond to the first block BL31. According to a determination result from the block determiner 151, only the first degradation information generator 152 may be operated, and the second degradation information generator 153 may not be operated.

The first degradation information generator 152 may receive first degradation information AGE1[n−1](BL31) on the first block BL31 from the memory 17. The first degradation information generator 152 may calculate an n-th first degradation amount CDA1[*n*](BL31), based on the input grayscales IGV(BL31). The first degradation information generator 152 may accumulate the n-th first degradation amount CDA1[*n*](BL31) in the first degradation information AGE1[n−1](BL31), thereby storing the updated first degradation information AGE1[*n*](BL31) in the memory 17.

The pixel determiner 154 may determine that the input grayscales IGV(RP1), IGV(GP1), and IGV(BP1) all correspond to the first pixels RP1, GP1, and BP1. Accordingly, the grayscale changer 155 may change the input grayscales IGV(BL31) to output grayscales OGV (BL31), based on the first degradation information AGE1[*n*](BL31).

In an embodiment, the grayscale changer 155 may interpolate the first degradation information AGE1[*n*](BL31) on the first block BL31 with first degradation information of at least one selected from adjacent blocks BL21, BL32, . . . , thereby generating first individual degradation information AGE1[*n*](RP1), AGE1[*n*](GP1), and AGE1[*n*](BP1) on each pixel as shown in FIG. 6. The grayscale changer 155 may apply the first individual degradation information AGE1[*n*](RP1), AGE1[*n*](GP1), and AGE1[*n*](BP1) to corresponding input grayscales IGV(RP1), IGV(GP1), and IGV (BP1), thereby generating the output grayscales OGV (BL31).

Figure 7:
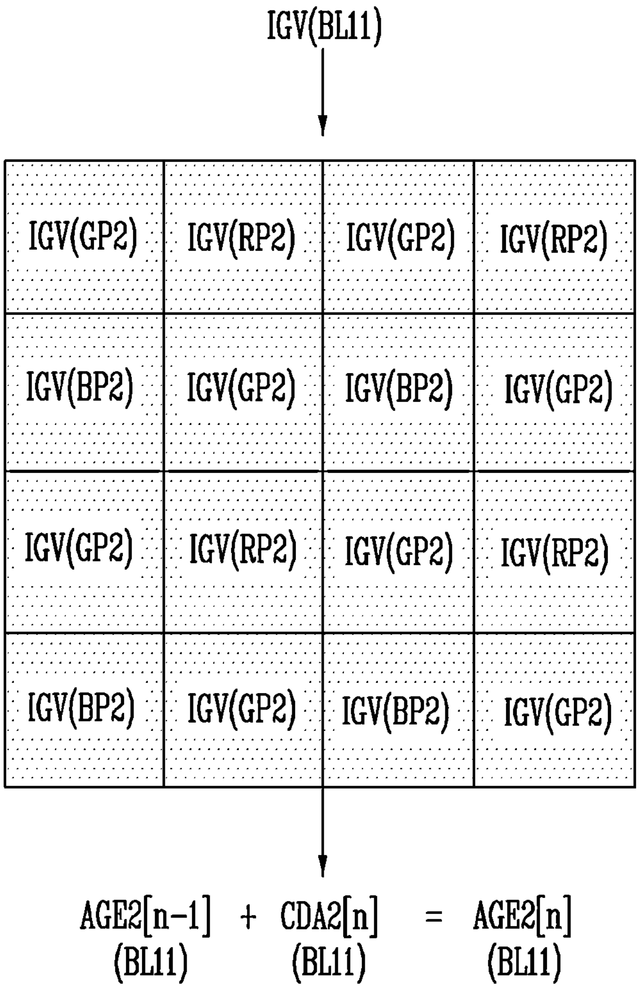
FIGS. 7 and 8 are diagrams illustrating a degradation compensation process of second blocks in accordance with an embodiment of the disclosure.
Figure 8:
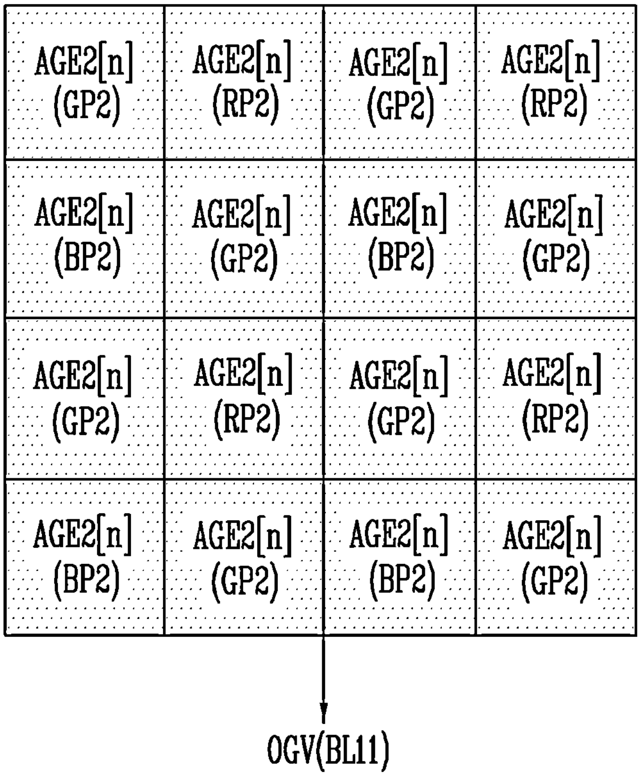

FIGS. 7 and 8 are diagrams illustrating a degradation compensation process of the second blocks in accordance with an embodiment of the disclosure.

A process in which the degradation compensator 15 is operated with respect to a second block BL11 according to an embodiment will hereinafter be described with reference to FIGS. 7 and 8.

In FIG. 7, input grayscales IGV(BL11) are input grayscales IGV(RP2), IGV(GP2), and IGV(BP2) for pixels belonging to the second block BL11, and therefore, the block determiner 151 may determine that the input grayscales IGV(BL11) correspond to the second block BL11. According to a determination result from the block determiner 151, only the second degradation information generator 153 may be operated, and the first degradation information generator 152 may not be operated.

The second degradation information generator 153 may receive second degradation information AGE2[n−1](BL11) on the second block BL11 from the memory 17. The second degradation information generator 153 may calculate an n-th second degradation amount CDA2[*n*](BL11), based on the input grayscales IGV(BL11). The second degradation information generator 153 may accumulate the n-th second degradation amount CDA2[*n*](BL11) in the second degradation information AGE2[n−1](BL11), thereby storing the updated second degradation information AGE2[*n*](BL11) in the memory 17.

The pixel determiner 154 may determine that the input grayscales IGV(RP2), IGV(GP2), and IGV(BP2) all correspond to the second pixels RP2, GP2, and BP2. Accordingly, the grayscale changer 155 may change the input grayscales IGV(BL11) to output grayscales OGV (BL11), based on the second degradation information AGE2[*n*](BL11).

In an embodiment, the grayscale changer 155 may interpolate the second degradation information AGE2[*n*](BL11) on the second block BL11 with second degradation information of at least one of adjacent blocks BL12, BL21, . . . , thereby generating second individual degradation information AGE2[*n*](RP2), AGE2[*n*](GP2), and AGE2[*n*](BP2) on each pixel as shown in FIG. 8. The grayscale changer 155 may apply the second individual degradation information AGE2[*n*](RP2), AGE2[*n*](GP2), and AGE2[*n*](BP2) to corresponding input grayscales IGV(RP2), IGV(GP2), and IGV (BP2), thereby generating the output grayscales OGV (BL11).

Figure 9:
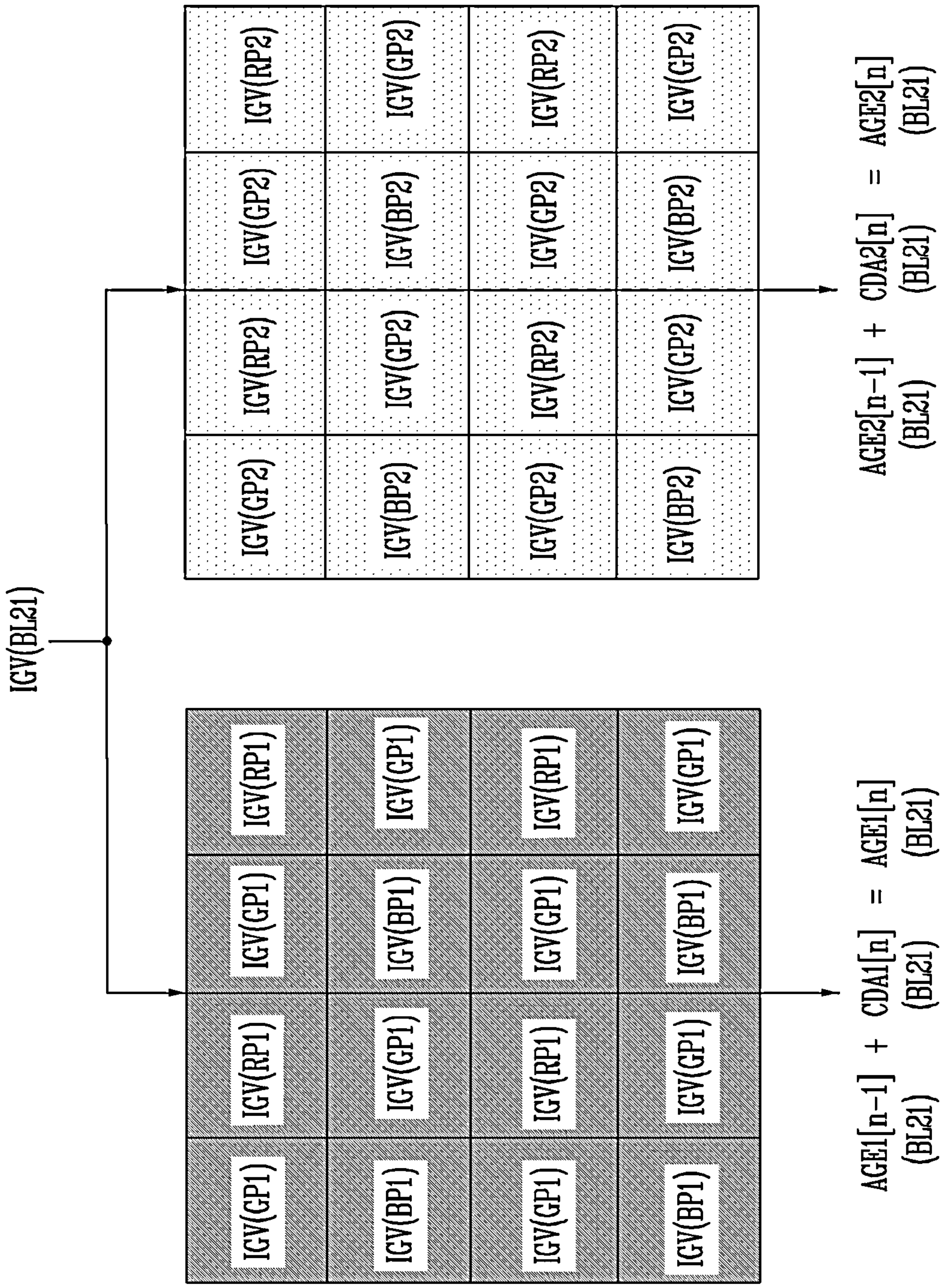
FIGS. 9 and 10 are diagrams illustrating a degradation compensation process of third blocks in accordance with an embodiment of the disclosure.
Figure 10:
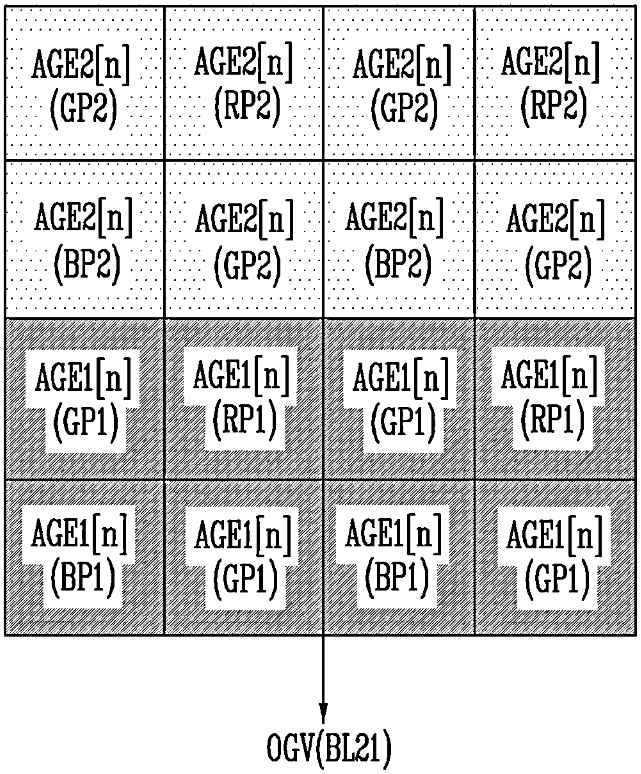

FIGS. 9 and 10 are diagrams illustrating a degradation compensation process of the third blocks in accordance with an embodiment of the disclosure.

A process in which the degradation compensator 15 is operated with respect to a third block BL21 is described with reference to FIGS. 9 and 10.

In FIG. 9, input grayscales IGV(BL21) are input grayscales IGV(RP1), IGV(GP1), IGV(BP1), IGV(RP2), IGV (GP2), and IGV(BP2) for pixels belonging to the third block BL21, and therefore, the block determiner 151 may determine that the input grayscales IGV(BL21) correspond to the third block BL21. According to a determination result, only both the first degradation information generator 152 and the second degradation information generator 153 may be operated.

The first degradation information generator 152 may receive first degradation information AGE1[n−1](BL21) on the third block BL21 from the memory 17. The first degradation information generator 152 may calculate an n-th first degradation amount CDA1[*n*](BL21), based on the input grayscales IGV(BL21). The first degradation information generator 152 may accumulate the n-th first degradation amount CDA1[*n*](BL21) in the first degradation information AGE1[n−1](BL21), thereby storing the updated first degradation information AGE1[*n*](BL21) in the memory 17.

In addition, the second degradation information generator 153 may receive second degradation information AGE2[n−1](BL21) on the third block BL21 from the memory 17. The second degradation information generator 153 may calculate an n-th second degradation amount CDA2[*n*](BL21), based on the input grayscales IGV(BL21). The second degradation information generator 153 may accumulate the n-th second degradation amount CDA2[*n*](BL21) in the second degradation information AGE2[n−1](BL21), thereby storing the updated second degradation information AGE2[*n*](BL21) in the memory 17.

The pixel determiner 154 may determine that some IGV (RP1), IGV(GP1), and IGV(BP1) among the input grayscales IGV(BL21) correspond to the first pixels RP1, GP1, and BP1. Also, the pixel determiner 154 may determine that some IGV(RP2), IGV(GP2), and IGV(BP2) among the input grayscales IGV(BL21) correspond to the second pixels RP2, GP2, and BP2.

The grayscale changer 155 may change some IGV(RP1), IGV(GP1), and IGV(BP1) among the input grayscales IGV (BL21) to some of output grayscales OGV (BL21), based on the first degradation information AGE1[*n*](BL21). Also, the grayscale changer 155 may change some IGV(RP2), IGV (GP2), and IGV(BP2) among the input grayscales IGV (BL21) to some of the output grayscales OGV (BL21), based on the second degradation information AGE2[*n*] (BL21).

In an embodiment, the grayscale changer 155 may interpolate the first degradation information AGE1[*n*](BL21) on the third block BL21 with first degradation information of at least one of adjacent blocks BL11, BL22, BL31, . . . , thereby generating first individual degradation information AGE1 [*n*](RP1), AGE1[*n*](GP1), and AGE1[*n*](BP1) on each pixel, as shown in FIG. 10. The grayscale changer 155 may apply the first individual degradation information AGE1[*n*](RP1), AGE1[*n*](GP1), and AGE1[*n*](BP1) to corresponding input grayscales IGV(RP1), IGV(GP1), and IGV(BP1), thereby generating some of the output grayscales OGV (BL21.

In an embodiment, the grayscale changer 155 may interpolate the second degradation information AGE2[*n*](BL21) on the third block BL21 with second degradation information of at least one of adjacent blocks BL11, BL22, BL31, . . . , thereby generating second individual degradation information AGE2[*n*](RP2), AGE2[*n*](GP2), and AGE2[*n*] (BP2) on each pixel, as shown in FIG. 10. The grayscale changer 155 may apply the second individual degradation information AGE2[*n*](RP2), AGE2[*n*](GP2), and AGE2[*n*](BP2) to corresponding input grayscales IGV(RP2), IGV(GP2), and IGV(BP2), thereby generating some of the output grayscales OGV (BL21).

Figure 11:
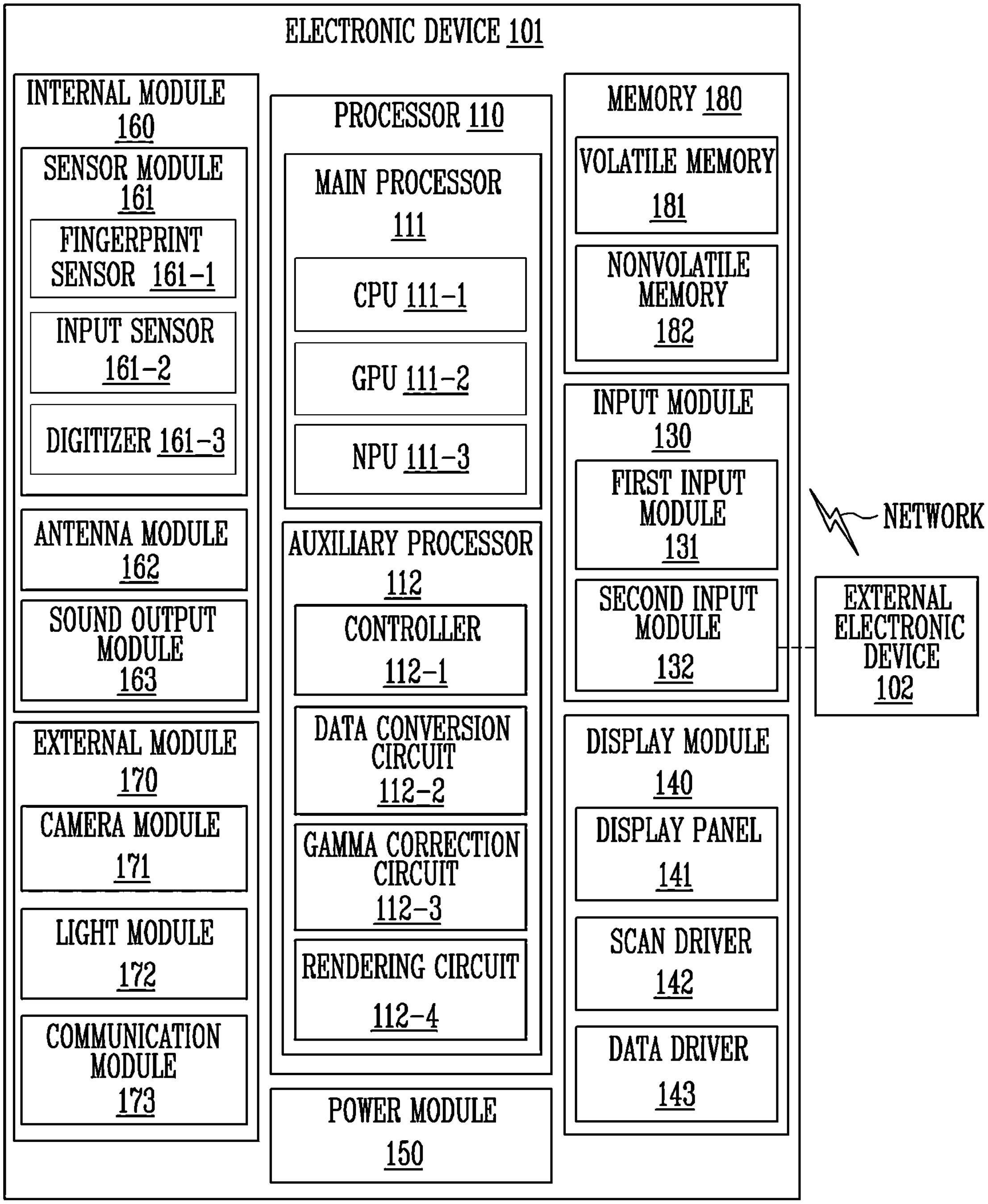
FIG. 11 is a block diagram of an electronic device in accordance with embodiments of the disclosure.

FIG. 11 is a block diagram of an electronic device 101 in accordance with embodiments of the disclosure.

The degradation compensator 15 described in FIGS. 1 to 10 may be included in at least one of various blocks, elements or modules included in the electronic device 101. In an embodiment, for example, the degradation compensator 15 may be implemented as or defined by a portion of a processor 110.

The electronic device 101 outputs various information through a display module 140 in an operating system. When the processor 110 executes an application stored in a memory 180, the display module 140 provides application information to a user through a display panel 141.

The processor 110 acquires an external input through an input module 130 or a sensor module 161, and executes an application corresponding to the external input. In an embodiment, for example, when the user selects a camera icon displayed through the display panel 141, the processor 110 acquires a user input through an input sensor 161-2, and activates a camera module 171. The processor 110 transfers, to the display module 140, image data corresponding to a photographed image acquired through the camera module 171. The display module 140 may display an image corresponding to the photographed image through the display panel 141.

In an embodiment, for example, when personal information authentication is executed in the display module 140, a fingerprint sensor 161-1 acquires input fingerprint information as input data. The processor 110 compares the input data acquired through the fingerprint sensor 161-1 with authentication data stored in the memory 180, and executes an application according to a comparison result. The display module 140 may display information executed according to a logic of the application through the display panel 141.

In an embodiment, for example, when a music streaming icon displayed through the display module 140 is selected, the processor 110 acquires a user input through the input sensor 161-2, and activates a music streaming application stored in the memory 180. When a music execution command is input in the music streaming application, the processor 110 activates a sound output module 163, thereby providing the user with sound information corresponding to the music execution command.

An operation of the electronic device 101 has been briefly described above. Hereinafter, a configuration of the electronic device 101 will be described in detail. Some of components of the electronic device 101, which will be described later, may be integrated to be provided as one component, and one component may be divided into two or more components to be provided.

Referring to FIG. 11, the electronic device 101 may communicate with an external electronic device 102 through a network (e.g., a short-range wireless communication network or a long-range wireless communication network). In accordance with an embodiment, the electronic device 101 may include the processor 110, the memory 180, the input module 130, the display module 140, a power module 150, an internal module 160, and an external module 170. In accordance with an embodiment, in the electronic device 101, at least one selected from the above-described components may be omitted, or at least another component may be added. In accordance with an embodiment, some components (e.g., the sensor module 161, an antenna module 162, or the sound output module 163) among the above-described components may be integrated in another component (e.g., the display module 140).

The processor 110 may control at least another component (e.g., a component of hardware or software) of the electronic device 101, which is connected to the processor 110, by executing software, and perform various data processing or calculations. In accordance with an embodiment, as at least a portion of data processing or calculation, the processor 110 may store command or data, received from another component (e.g., the input module 130, the sensor module 161, or a communication module 173), in a volatile memory 181, and process a command or data, stored in the volatile memory 181. Result data may be stored in a nonvolatile memory 182.

The processor 110 may include a main processor 111 and an auxiliary processor 112. The main processor 111 may include at least one selected from a central processing unit (CPU) 111-1 and an application processor (AP). The main processor 111 may further include at least one selected from a graphic processing unit (GPU) 111-2, a communication processor (CP), and an image signal process (ISP). The main processor 111 may further include a neural processing unit (NPU) 111-3. The NPU 111-3 is a process specialized in processing of an artificial intelligence model, and the artificial intelligence model may be generated through machine learning. The artificial intelligence model may include a plurality of artificial neural network layers. An artificial neural network may be one selected from a deep neural network (DNN), a convolution neural network (CNN), a recurrent neural network (RNN, Recurrent Boltzmann Machine), a restricted Boltzmann machine (RBM), a deep belief network (DBN), a deep Q-Network, and any combination of at least two of the above-described networks, but the disclosure is not limited to those described above. The artificial intelligence model may include additionally or substitutionally a software structure in addition to the hardware structure. At least two selected from the above-described processing units and the above-described processors may be implemented into one integrated component (e.g., a single chip). Alternatively, the at least two components may be implemented as independent components (e.g., a plurality of chips).

The auxiliary processor 112 may include a controller 112-1. The controller 112-1 may include an interface conversion circuit and a timing control circuit. The controller 112-1 receives an image signal from the main processor 111, and outputs image data by converting a data format of the image signal to be suitable for an interface specification with the display module 140. The controller 112-1 may output various control signals used for driving of the display module 140.

The auxiliary processor 112 may further include a data conversion circuit 112-2, a gamma correction circuit 112-3, a rendering circuit 112-4, and the like. The data conversion circuit 112-2 may receive image data from the controller 112-1, and compensate for the image data such that an image is displayed with a desired luminance according to a characteristic of the electronic device 101, a configuration of the user, or the like or convert the image data to achieve reduction of power consumption, afterimage compensation, or the like. The gamma correction circuit 112-3 may convert image data, a gamma reference voltage, or the like such that an image displayed in the electronic device 101 has a desired gamma characteristic. The rendering circuit 112-4 may receive image data from the controller 112-1, and render the image data by considering a pixel arrangement of the display panel 141, and the like, applied to the electronic device 101. At least one selected from the data conversion circuit 112-2, the gamma correction circuit 112-3, and the rendering circuit 112-4 may be integrated in another component (e.g., the main processor 111 or the controller 112-1). At least one selected from the data conversion circuit 112-2, the gamma correction circuit 112-3, and the rendering circuit 112-4 may be integrated in a data driver 143 which will be described later.

The memory 180 may store various data used by at least one component (e.g., the processor 110 or the sensor module 161), and input data or output data about a command associated therewith. The memory 180 may include at least one of the volatile memory 181 and the nonvolatile memory 182.

The input module 130 may receive a command or data to be used in a component (e.g., the processor 110, the sensor module 161) of the electronic device 101 from the outside (e.g., the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (e.g., a button), or a pen (e.g., a passive pen or an active pen). The second input module 132 may support a specified protocol through which the second input module 132 can be connected to the external electronic device 102 by wired or wireless. In accordance with an embodiment, the second input module 132 may include a high definition multimedia interface (HDMI), a universal serial bus (USB) interface, an SD card interface, or an audio interface. The second input module 132 may include a connector capable of physically connecting the second input module 132 to the external electronic device 102, e.g., an HDMI connector, a USB connector, an SD card connector, or an audio connector (e.g., a headphone connector).

The display module 140 provides visual information to the user. The display module 140 may include the display panel 141, a scan driver 142, and the data driver 143. The display module 140 may further include a window, a chassis, and a bracket, which are used to protect the display panel 141.

The display panel 141 may include a liquid crystal display panel, an organic light emitting display panel, or an inorganic light emitting display panel, and the kind of the display panel 141 is not particularly limited. The display panel 141 may be of a rigid type, be of a rollable type in which rolling is possible, or be of a flexible type in which folding is possible. The display module 140 may further include a supporter for supporting the display panel 141, a bracket, a head dissipation member, or the like.

The scan driver 142 is a driving chip, and may be mounted in the display panel 141. Also, the scan driver 142 may be integrated in the display panel 141. In an embodiment, for example, the scan driver 142 may include an amorphous silicon TFT gate (ASG) driver circuit, a low temperature polycrystalline silicon (LTPS) TFT gate driver circuit, or an oxide semiconductor TFT gate (OSG) driver circuit, which is embedded in the display panel 141. The scan driver 142 receives a control signal from the controller 112-1, and outputs scan signals to the display panel 141 in response to the control signal.

The display panel 141 may further include an emission driver (not shown). The emission driver outputs an emission control signal to the display panel 141 in response to the control signal received from the controller 112-1. The emission driver may be formed to be distinguished from the scan driver 142, or be integrated in the scan driver 142.

The data driver 143 receives a control signal from the controller 112-1, and converts image data into an analog voltage (e.g., a data voltage) and then outputs data voltages to the display panel 141 in response to the control signal.

The data driver 143 may be integrated in another component (e.g., the controller 112-1). Functions of the interface conversion circuit and the timing control circuit of the above-described controller 112-1 may be integrated in the data driver 143.

The display module 140 may further include an emission driver, a voltage generating circuit, and the like. The voltage generating circuit may output various voltages used for driving of the display panel 141.

The power module 150 supplies power to components of the electronic device 101. The power module 150 may include a battery for charging a power voltage. The battery may include a primary battery in which recharging is impossible, a secondary battery in which recharging is possible, or a fuel cell. The power module 150 may include a power management integrated circuit (PMIC). The PMIC supplies power optimized for each of the above-described modules and modules which will be described later. The power module 150 may include a wireless power transmitting/receiving member electrically connected to the battery. The wireless power transmitting/receiving member may include a plurality of coil-shaped antenna radiators.

The electronic device 101 may further include an internal module 160 and an external module 170. The internal module 160 may include the sensor module 161, the antenna module 162, and the sound output module 163. The external module 170 may include the camera module 171, a light module 172, and the communication module 173.

The sensor module 161 may sense an input caused by a body of the user or an input caused by a pen as the first input module 131, and generate an electrical signal or a data value, which corresponds to the input. The sensor module 161 may include at least one selected from the fingerprint sensor 161-1, the input sensor 161-2, and a digitizer 161-3.

The fingerprint sensor 161-1 may generate a data value corresponding to a fingerprint of the user. The fingerprint sensor 161-1 may include any one of an optical-type fingerprint sensor or a capacitance type fingerprint sensor.

The input sensor 161-2 may generate a data value corresponding to coordinate information of the input caused by the body of the user or the input by the pen. The input sensor 161-2 generates, as a data value, a capacitance variation caused by an input. The input sensor 161-2 may sense an input caused by a passive pen, or transmit/receive data to/from an active pen.

The input sensor 161-2 may also measure a biometric signal such as blood pressure, moisture, or body fat. In an embodiment, for example, when the user does not move for a certain time while allowing a body part to be in contact with a sensor layer or a sensing panel, the input sensor 161-2 may output information for the user by sensing a biometric signal, based on an electric field change caused by the body part.

The digitizer 161-3 may generate a data value corresponding to the coordinate information of the input caused by the pen. The digitizer 161-3 generates, as a data value, an electric field variation caused by an input. The digitizer 161-3 may sense an input caused by a passive pen, or transmit/receive data to/from an active pen.

At least one selected from the fingerprint sensor 161-1, the input sensor 161-2, and the digitizer 161-3 may be implemented with a sensor layer formed on the display panel 141 through a continuous process. The fingerprint sensor 161-1, the input sensor 161-2, and the digitizer 161-3 may be disposed on the top of the display panel 141, and any one, e.g., the digitizer 161-3, of the fingerprint sensor 161-1, the input sensor 161-2, and the digitizer 161-3 may be disposed on the bottom of the display panel 141.

At least two selected from the fingerprint sensor 161-1, the input sensor 161-2, and the digitizer 161-3 may be formed to be integrated into one sensing panel through the same process. In an embodiment where at least two selected from the fingerprint sensor 161-1, the input sensor 161-2, and the digitizer 161-3 are integrated into one sensing panel, the sensing panel may be disposed between the display panel 141 and the window disposed on the top of the display panel 141. In accordance with an embodiment, the sensing panel may be disposed on the window, and the position of the sensing panel is not particularly limited.

At least one selected from the fingerprint sensor 161-1, the input sensor 161-2, and the digitizer 161-3 may be built or disposed in the display panel 141. That is, at least one of the fingerprint sensor 161-1, the input sensor 161-2, and the digitizer 161-3 may be simultaneously formed through a process of forming elements (e.g., a light emitting element, a transistor, and the like) included in the display panel 141.

In addition, the sensor module 161 may generate an electrical signal or a data value, which corresponds to an internal state or an external state of the electronic device 101. The sensor module 161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 162 may include one or more antennas for transmitting a signal or power to the outside or receiving a signal or power from the outside. In accordance with an embodiment, the communication module 173 may transmit or receive a signal to or from the external electronic device through an antenna suitable for a communication scheme. An antenna pattern of the antenna module 162 may be integrated in one configuration (e.g., the display panel 141) of the display module 140, the input sensor 161-2, or the like.

The sound output module 163 is a device for outputting a sound signal to the outside of the electronic device 101, and may include, for example, a speaker used for a general purpose such as multimedia replay or recording replay and a receiver used for only phone reception. In accordance with an embodiment, the receiver may be formed integrally with or separately from the speaker. A sound output pattern of the sound output module 163 may be integrated in the display module 140.

The camera module 171 may photograph a still image and a moving image. In accordance with an embodiment, the camera module 171 may include at least one lens, an image sensor, or an image signal processor. The camera module 171 may further include an infrared camera capable of measuring existence of the user, a position of the user, eyes of the user, or the like.

The light module 172 may provide light. The light module 172 may include a light emitting diode or a xenon lamp. The light module 172 may be operated in interlock with the camera module 171 or be operated independently from the camera module 171.

The communication module 173 may support establishment of a wired or wireless communication channel between the electronic device 101 and the external electronic device 102 and communication performance through the established communication channel. The communication module 173 may include any one of a wireless communication module such as a cellular communication module, a short-range wireless communication module, or global navigation satellite system (GNSS) communication module and a wired communication module such as a local area network (LAN) communication module or a power line communication module, or include both the wireless communication module and the wired communication module. The communication module 173 may communicate with the external electronic device 102 through a short-range communication network such as Bluetooth, WiFi direct, or infrared data association (IrDA) or a long-range communication network such as a cellular network, Internet, or a computer network (e.g., LAN or WAN). The above-described several kinds of communication modules may be implemented into one chip, or each of the communication modules may be implemented as a separate chip.

The input module 130, the sensor module 161, the camera module 171, and the like may be used to control an operation of the display module 140 in interlock with the processor 110.

The processor 110 outputs a command or data to the display module 140, the sound output module 163, the camera module 171, or the light module 172, based on input data received from the input module 130. In an embodiment, for example, the processor 110 may generate image data, corresponding to input data applied through a mouse, an active pen, or the like, and output the image data to the display module 140. Alternatively, the processor 110 may generate command data, corresponding to the input data, and output the command data to the camera module 171 or the light module 172. When any input data is not received for a certain time from the input module 130, the processor 110 may change an operation mode of the electronic device 101 to a low power mode or a sleep mode, thereby reducing power consumed by the electronic device 101.

The processor 110 outputs a command or data to the display module 140, the sound output module 163, the camera module 171, or the light module 172, based on sensing data received from the sensor module 161. In an embodiment, for example, the processor 110 may compare authentication data applied by the fingerprint sensor 161-1 with authentication data stored in the memory 180, and then execute an application according to a comparison result. Based on sensing data sensed by the input sensor 161-2 or the digitizer 161-3, the processor 110 may execute a command or output the corresponding image data to the display module 140. When a temperature sensor is included in the sensor module 161, the processor may receive temperature data about a temperature measured from the sensor module 161, and further perform luminance correction of image data, or the like, based on the temperature data.

The processor 110 may receive, from the camera module 171, measurement data about existence of the user, a position of the user, eyes of the user, or the like. The processor 110 may further perform luminance correction of image data, based on the measurement data. In an embodiment, for example, the processor 110 which determines the existence of the user through an input from the camera module 171 may output image data of which luminance is corrected to the display module 140 through the data conversion circuit 112-2 or the gamma correction circuit 112-3.

Some components among the components may be connected to each other through a communication scheme between peripheral devices, e.g., a bus, a general purpose input/output (GPIO), a serial peripheral interface (SPI), a mobile industry processor interface (MIPI), or an ultra path interconnect (UPI) link, to exchange a signal (e.g., a command or data) with each other. The processor 110 may communicate with the display module 140 through an engaged interface. In an embodiment, for example, the processor 110 may use any one of the above-described communication schemes. However, the disclosure is not limited to the above-described communication scheme.

The electronic device 101 in accordance with various embodiments may be one of various types of devices. In an embodiment, for example, the electronic device 101 may be a portable communication device (e.g., a smartphone), a computer device, a portable multimedia device, a portable medical device, a camera, a wearable device, or an electrical appliance. The electronic device 101 in accordance with the embodiment of the disclosure is not limited to the above-described devices.

In the display device and the driving method thereof in accordance with embodiments of the disclosure, although different kinds of pixels are degraded, the degradation of the pixels can be compensated with a minimum memory capacity.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An integrated chip communicating with a memory and a pixel unit including first pixels disposed with a first density in a first area and second pixels disposed with a second density less than the first density in a second area in contact with the first area, the integrated chip comprising:

a degradation compensator which updates degradation information stored in the memory, based on input grayscales for the first pixels and the second pixels, and changes the input grayscales to output grayscales, based on the degradation information, wherein the degradation compensator stores the degradation information in the memory in a unit of block for the pixel unit, and wherein the memory stores only first degradation information for each of first blocks including only the first pixels, stores only second degradation information for each of second blocks including only the second pixels, and stores both the first degradation information and the second degradation information for each of third blocks including both the first pixels and the second pixels.

2. The integrated chip of claim 1, wherein the first degradation information is information obtained under a condition that pixels constituting a corresponding block are all the first pixels, and the second degradation information is information obtained under a condition that pixels constituting a corresponding block are all the second pixels.

3. The integrated chip of claim 2, wherein a size of a storage space of the degradation information allocated to the memory for each of the third blocks is greater than a size of a storage space of the degradation information allocated to the memory for each of the first blocks or each of the second blocks.

4. The integrated chip of claim 3, wherein a size of a storage space of the first degradation information allocated to the memory and a size of a storage space of the second degradation information allocated to the memory are the same as each other.

5. The integrated chip of claim 4, wherein the size of the storage space of the degradation information allocated to the memory for each of the third blocks is two times the size of the storage space of the degradation information allocated to the memory for each of the first blocks or each of the second blocks.

6. The integrated chip of claim 1, wherein the degradation compensator includes a block determiner which determines a corresponding block of the input grayscales, among the first blocks, the second blocks, and the third blocks.

7. The integrated chip of claim 6, wherein the degradation compensator further includes a first degradation information generator which updates the first degradation information of the corresponding block, based on the input grayscales determined to correspond to the first blocks or the third blocks.

8. The integrated chip of claim 7, wherein the degradation compensator further includes a second degradation information generator which updates the second degradation information of the corresponding block, based on the input grayscales determined to correspond to the second blocks or the third blocks.

9. The integrated chip of claim 8, wherein the degradation compensator further includes a pixel determiner which determines corresponding pixels of the input grayscales, among the first pixels and the second pixels.

10. The integrated chip of claim 9, wherein the degradation compensator further includes a grayscale changer which changes the input grayscales to the output grayscales, based on the first degradation information, when the input grayscales correspond to the first pixels, and changes the input grayscales to the output grayscales, based on the second degradation information, when the input grayscales correspond to the second pixels.

11. An electronic device comprising:

a processor providing input grayscales with respect to an image frame; and a display device receiving the input grayscales, wherein the display device comprising:

a memory;

a pixel unit including first pixels disposed with a first density in a first area, the pixel unit including second pixels disposed with a second density less than the first density in a second area in contact with the first area; and a degradation compensator which updates degradation information stored in the memory, based on the input grayscales for the first pixels and the second pixels, and changes the input grayscales to output grayscales, based on the degradation information, wherein the degradation compensator stores the degradation information in the memory in a unit of block for the pixel unit, and wherein the memory stores only first degradation information for each of first blocks including only the first pixels, stores only second degradation information for each of second blocks including only the second pixels, and stores both the first degradation information and the second degradation information for each of third blocks including both the first pixels and the second pixels.

12. The electronic device of claim 11, wherein the first degradation information is information obtained under a condition that pixels constituting a corresponding block are all the first pixels, and the second degradation information is information obtained under a condition that pixels constituting a corresponding block are all the second pixels.

13. The electronic device of claim 12, wherein a size of a storage space of the degradation information allocated to the memory for each of the third blocks is greater than a size of a storage space of the degradation information allocated to the memory for each of the first blocks or each of the second blocks.

14. The electronic device of claim 13, wherein a size of a storage space of the first degradation information allocated to the memory and a size of a storage space of the second degradation information allocated to the memory are the same as each other.

15. The electronic device of claim 14, wherein the size of the storage space of the degradation information allocated to the memory for each of the third blocks is two times the size of the storage space of the degradation information allocated to the memory for each of the first blocks or each of the second blocks.

16. The electronic device of claim 11, wherein the degradation compensator includes a block determiner which determines a corresponding block of the input grayscales, among the first blocks, the second blocks, and the third blocks.

17. The electronic device of claim 16, wherein the degradation compensator further includes a first degradation information generator which updates the first degradation information of the corresponding block, based on the input grayscales determined to correspond to the first blocks or the third blocks.

18. The electronic device of claim 17, wherein the degradation compensator further includes a second degradation information generator which updates the second degradation information of the corresponding block, based on the input grayscales determined to correspond to the second blocks or the third blocks.

19. The electronic device of claim 18, wherein the degradation compensator further includes a pixel determiner which determines corresponding pixels of the input grayscales, among the first pixels and the second pixels.

20. The electronic device of claim 19, wherein the degradation compensator further includes a grayscale changer which changes the input grayscales to the output grayscales, based on the first degradation information, when the input grayscales correspond to the first pixels, and changes the input grayscales to the output grayscales, based on the second degradation information, when the input grayscales correspond to the second pixels.

* * * * *